(12) United States Patent
Sugiyama et al.

(10) Patent No.: US 10,683,052 B2
(45) Date of Patent: Jun. 16, 2020

(54) VEHICLE STRUCTURE FOR MOUNTING AIR-COOLED INTERNAL COMBUSTION ENGINE

(71) Applicant: HONDA MOTOR CO., LTD., Tokyo (JP)

(72) Inventors: Masanori Sugiyama, Wako (JP); Katsuhiko Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 165 days.

(21) Appl. No.: 15/900,161

(22) Filed: Feb. 20, 2018

(65) Prior Publication Data
US 2018/0265161 A1    Sep. 20, 2018

(30) Foreign Application Priority Data

Mar. 16, 2017    (JP) ................. 2017-051463

(51) Int. Cl.
| | |
|---|---|
| *B62K 11/04* | (2006.01) |
| *B62M 7/06* | (2006.01) |
| *F01P 1/02* | (2006.01) |
| *F02F 1/06* | (2006.01) |
| *F02B 61/02* | (2006.01) |

(Continued)

(52) U.S. Cl.
CPC ............. *B62K 11/04* (2013.01); *B62M 7/02* (2013.01); *B62M 7/06* (2013.01); *F01P 1/02* (2013.01); *F02B 61/02* (2013.01); *F02F 1/06* (2013.01); *B62J 11/13* (2020.02); *F01P 2001/026* (2013.01)

(58) Field of Classification Search
CPC . B62K 11/04; B62M 7/02; B62M 7/06; F02F 1/06
USPC ......................................................... 180/228
See application file for complete search history.

(56) References Cited

U.S. PATENT DOCUMENTS

| | | | | | |
|---|---|---|---|---|---|
| 4,237,996 | A | * | 12/1980 | Matsuda ............... | B62K 11/04 180/229 |
| 4,421,195 | A | * | 12/1983 | Aiba ..................... | B62M 7/02 180/228 |

(Continued)

FOREIGN PATENT DOCUMENTS

JP    4602235 B2    10/2010

*Primary Examiner* — Tony H Winner
(74) *Attorney, Agent, or Firm* — Birch, Stewart, Kolasch & Birch, LLP (57) ABSTRACT

In the vehicle structure for mounting an air-cooled internal combustion engine, a crankcase is supported by a body frame in such a manner that crankcase hanger bosses on the crankcase are joined to the body frame via crankcase hanger plates. A cylinder head has left and right cylinder head hanger seating surfaces formed perpendicular to a left-right horizontal direction by cutting out right and left symmetric areas close to side edges of left and right side faces of the cylinder head along with parts of cooling fins. One ends of left and right cylinder head hanger members are fastened respectively to cylinder head hanger attaching seats on which the left and right cylinder head hanger seating surfaces of the cylinder head are formed. The other ends of the left and right cylinder head hanger members are fastened individually to the body frame. The structure is capable of using an engine body itself to improve stiffness of a body frame without use of any particular reinforcing members.

9 Claims, 7 Drawing Sheets

(51) Int. Cl.
*B62M 7/02* (2006.01)
*B62J 11/13* (2020.01)

(56) References Cited

U.S. PATENT DOCUMENTS

| | | | | |
|---|---|---|---|---|
| 4,550,698 | A * | 11/1985 | Konneker | B62M 7/02 |
| | | | | 123/195 AC |
| 5,876,013 | A * | 3/1999 | Ott | B62K 11/04 |
| | | | | 180/228 |
| 6,382,169 | B1 * | 5/2002 | Gausman | F01P 7/026 |
| | | | | 123/195 R |
| 7,296,814 | B2 * | 11/2007 | Miyamoto | B62K 11/04 |
| | | | | 180/219 |
| 7,621,248 | B2 * | 11/2009 | Chiba | F02M 35/10085 |
| | | | | 123/184.21 |
| 8,104,565 | B2 * | 1/2012 | Miyashiro | B62K 25/283 |
| | | | | 180/219 |
| 8,757,314 | B2 * | 6/2014 | Mizukura | B62M 7/00 |
| | | | | 180/228 |
| 8,776,933 | B2 * | 7/2014 | Toda | B62K 11/04 |
| | | | | 180/219 |
| 2003/0106733 | A1 * | 6/2003 | Keller | B62K 11/04 |
| | | | | 180/228 |
| 2007/0045025 | A1 * | 3/2007 | Hasegawa | B62K 11/04 |
| | | | | 180/228 |
| 2013/0098701 | A1 * | 4/2013 | Hirano | B62K 11/04 |
| | | | | 180/227 |
| 2016/0107714 | A1 * | 4/2016 | Ishida | B62K 11/04 |
| | | | | 180/228 |

\* cited by examiner

VEHICLE STRUCTURE FOR MOUNTING AIR-COOLED INTERNAL COMBUSTION ENGINE

TECHNICAL FIELD

The present invention relates to a vehicle structure for mounting an air-cooled internal combustion engine, suitable to be installed on a saddle riding vehicle.

BACKGROUND ART

In the air-cooled internal combustion engines, typically, cooling fins are formed to protrude from the outer peripheries of a cylinder and a cylinder head which are stacked in this order on a crankcase in a protruding manner.

Therefore, where the air-cooled internal combustion engine is installed on a saddle riding vehicle, a common example is that the crankcase is supported by being joined to the body frame (see, e.g., Patent Document 1).

PRIOR ART

Patent Document

[Patent Document 1] JP 4 602 235 B

In the structure disclosed in Patent Document 1, hanger bosses are formed on the outer periphery of a crankcase on which cooling fins are not formed, and the hanger bosses are joined to a body frame via case hanger members in order to support the crankcase, so that the air-cooled internal combustion engine is mounted on the vehicle.

SUMMARY OF INVENTION

Technical Problem

In general, in the case of the air-cooled internal combustion engines, the cylinder head on which the cooling fins are formed on the outer periphery thereof is not supported by or joined to the body frame, and only the crankcase corresponding to a lower half of the internal combustion engine is joined to a lower portion of the body frame, but an upper portion of the body frame is not joined to the internal combustion engine. Because of this, it is difficult to increase the stiffness of the entire body frame.

The present invention has been made in light of such circumstances, and it is an object of the present invention to provide a vehicle structure for mounting an air-cooled internal combustion engine to be capable of using an engine body itself to improve stiffness of an entire body frame without use of any particular reinforcing members.

Solution to Problem

To achieve this object, the present invention provides a vehicle structure for mounting an air-cooled internal combustion engine, in which the air-cooled internal combustion engine is mounted on a body frame of a saddle riding vehicle, the air-cooled internal combustion engine is configured such that a cylinder and a cylinder head are vertically stacked on a crankcase in this order and cooling fins are formed on an outer periphery of at least the cylinder head;
wherein the crankcase has hanger bosses formed at predetermined forward and rearward positions, and the crankcase is supported by the body frame with the hanger bosses joined to the body frame via crankcase hanger members; the cylinder head has left and right cylinder head hanger seating surfaces formed to be perpendicular to a left-right horizontal direction by cutting out right and left symmetric areas of the cylinder head as well as part of the cooling fins, the right and left symmetric areas being adjacent to side edges of left and right side faces of the cylinder head; the left and right cylinder head hanger seating surfaces of the cylinder head are formed on cylinder head hanger attaching seats to which one ends of left and right cylinder head hanger members are fastened respectively; and the left and right cylinder head hanger members have respectively the other ends fastened to the body frame.

With this configuration, the crankcase is supported by the body frame such that the hanger bosses, which are formed in predetermined forward and rearward positions, are joined via the crankcase hanger members to the body frame. Additionally, the left and right hanger seating surfaces perpendicular to a left-right horizontal direction are formed by cutting out the right and left symmetric areas close to the side edges of the left and right side faces of the cylinder head together with parts of the cooling fins. The left and right cylinder head hanger members have respective one ends fastened respectively to the left and right cylinder head hanger attaching seats on which the left and right cylinder head hanger seating surfaces are formed. The left and right cylinder head hanger members have respectively the other ends fastened to the body frame. As a result, the cylinder head is supported via the left and right cylinder head hanger members to the body frame, so that the crankcase, together with the cylinder head, is joined to the body frame. This enables reinforcement of the body frame via the internal combustion engine itself without use of any particular reinforcing members to offer improved stiffness of the body frame.

Further, because the left and right symmetric areas of the cylinder head, together with parts of the cooling fins, are cut out to form the left and right cylinder head hanger seating surfaces, height adjustment and improved attachment for the cylinder head hanger seating surfaces can be achieved.

In a preferred embodiment of the invention, the body frame is a double cradle frame; the cylinder head is configured to stand above the crankcase; and the left and right cylinder head hanger seating surfaces are formed respectively in areas on the left and right side faces of the cylinder head, the areas being respectively located closest to a pair of left and right upper frame portions of the double cradle frame.

With this configuration, the left and right cylinder head hanger seating surfaces are formed respectively in the left and right areas of the standing cylinder head, the left and right areas being respectively located closest to a pair of left and right upper frame portions of the double cradle frame. Because of this, the cylinder head hanger seating surface and the upper frame portion are able to be joined by the cylinder head hanger member of a short length. As a result, a further improvement in stiffness of the body frame and also a further reduction in weight can be achieved.

In a preferred embodiment of the invention, the pair of left and right upper frame portions is situated respectively upward of the left and right cylinder head hanger seating surfaces; the cylinder head hanger members are cylinder head hanger plates; and the left and right cylinder head hanger plates have respective one ends facing the cylinder head seating surfaces of the cylinder head, the one ends being fastened respectively to the cylinder head hanger attaching seats, and the left and right cylinder head hanger plates have the other ends respectively fastened to the left and right upper frame portions.

With this configuration, the plate-shaped cylinder head hanger plates, which have respective one ends facing the hanger seating surfaces of the cylinder head and fastened respectively to the cylinder head hanger attaching seats, have the respective other ends fastened to the left and right upper frame portions while the cylinder head hangers are in the vertical attitude perpendicular to the left-right horizontal direction. As a result, an improvement in stiffness and a reduction in weight of the cylinder head hanger plate can be achieved, and further an improvement in structural rigidity of the body frame can also be achieved.

In a further preferred embodiment of the invention, the one ends of the cylinder head hanger plates are fastened, respectively, to the cylinder head hanger attaching seats of the cylinder head by interposition of spacer members to create distances equal to or greater than the amount of protrusion of the cooling fins away from the cylinder head hanger seating surfaces toward outside in a left/right direction.

With this configuration, one ends of the cylinder head hanger plates are fastened to the cylinder head hanger attaching seats of the cylinder head by interposition of the spacer members so that the cylinder head hanger plates are located at a distance equal to or greater than the amount of protrusion of the cooling fins away from the cylinder head hanger seating surfaces toward outside in a left/right direction. Because of this, the cut cylinder head hanger seating surfaces can be covered with the cylinder head hanger plates at a height equal to or greater than the amount of protrusion of the cooling fins. The external appearance quality can thereby be improved, and also the cylinder head hanger plates can protect the cut corners of the cooling fins around the cylinder head hanger plates.

According to a preferred embodiment of the invention, the upper frame portion of the double cradle frame extends obliquely upward and rearward of the cylinder head to slope downward toward the rear in side view; the cylinder and the cylinder head, which are stacked in this order on the crankcase, stand while tilting forward; and the left and right cylinder head hanger seating surfaces are formed respectively in the left and right symmetric areas closest to the upper frame portions along rear edges of the left and right side faces of the cylinder head.

With this configuration, the cylinder head hanger seating surfaces, which are formed in the left and right symmetric areas closest to the upper frame portions along the rear edges of the left and right side faces of the forward-leaning cylinder head, are located at the highest positions of the cylinder head. And, by use of the cylinder head hanger plates with a length as short as possible, the cylinder head hanger seating surfaces are joined, at positions as high as possible, to the upper frame portions which are inclined downwardly toward the rear. This enables an improvement in structural rigidity of the body frame.

In a still preferred embodiment of the invention, the cylinder head (44) has a rear side face from which an intake passage extends rearward; the intake passage is provided with a throttle body in proximity to the cylinder head; and the left and right cylinder head hanger plates cover left and right sides of the throttle body.

With this configuration, because the left and right cylinder head hanger plates cover the left and right sides of the throttle body which is placed on the intake passage to be extended rearward from the rear side face of the cylinder head, the left and right cylinder head hanger plates protect the throttle body as well as an intake throttle pulley and the like which accompany the throttle body.

In a preferred embodiment of the invention, the intake passage is provided with a fuel injection valve located closer to the cylinder head than the throttle body.

With this configuration, the left and right cylinder head hanger plates can easily cover the throttle body as well as the fuel injection valve and the left and right sides of a fuel hose extending from the fuel injection valve, so that the fuel injection valve and so on are able to be protected.

In a preferred embodiment of the invention, one of the left and right cylinder head hanger plates has an inner side to which a clutch cable guide is attached.

With this configuration, spaces are created inward of the cylinder head hanger plates which are attached away from the cylinder head by use of the spacers, and the spaces are used to attach the clutch cable guide to the cylinder head hanger plates. Thus, a clutch cable is routed between a clutch operating unit on the handlebar of the saddle riding vehicle and a clutch on a side of the crankcase of the vehicle-installed internal combustion engine, and the clutch cable is directed to the inner sides of the cylinder head hanger plates which are placed on the left and right side faces of the cylinder head. As a result, although the clutch cable is routed with gentle curves without having any sharp bend, the clutch cable can provide coupling between the clutch and the clutch operating unit at a distance as short as possible. This enables a reduction in clutch operating load to improve the operability.

Advantageous Effects of Invention

According to the present invention, the crankcase is supported by the body frame such that the crankcase hanger bosses, which are formed in predetermined forward and rearward positions, are joined via the crankcase hanger members to the body frame. Additionally, the left and right crankcase hanger seating surfaces perpendicular to a left-right horizontal direction are formed by cutting out the right and left symmetric areas close to the side edges of the left and right side faces of the cylinder head along with parts of the cooling fins. The left and right cylinder head hanger members have respective one ends fastened respectively to the cylinder head hanger attaching seats on which the cylinder hanger seating surfaces are formed, and the cylinder head hanger members have the other ends fastened to the body frame. As a result, the cylinder head is supported via such cylinder head hanger members to the body frame, so that the crankcase, together with the cylinder head, is joined to the body frame. This enables an improvement in stiffness of the body frame via the internal combustion engine itself without use of any particular reinforcing member.

Further, because the left and right symmetric areas of the cylinder head, together with parts of the cooling fins, are cut out to form the left and right cylinder head hanger seating surfaces, a height change and improved attachment accuracy for the cylinder head hanger seating surface can be achieved.

DETAILED DESCRIPTION OF EMBODIMENT

An embodiment of the present invention will now be described with reference to the drawings.

Figure 1:
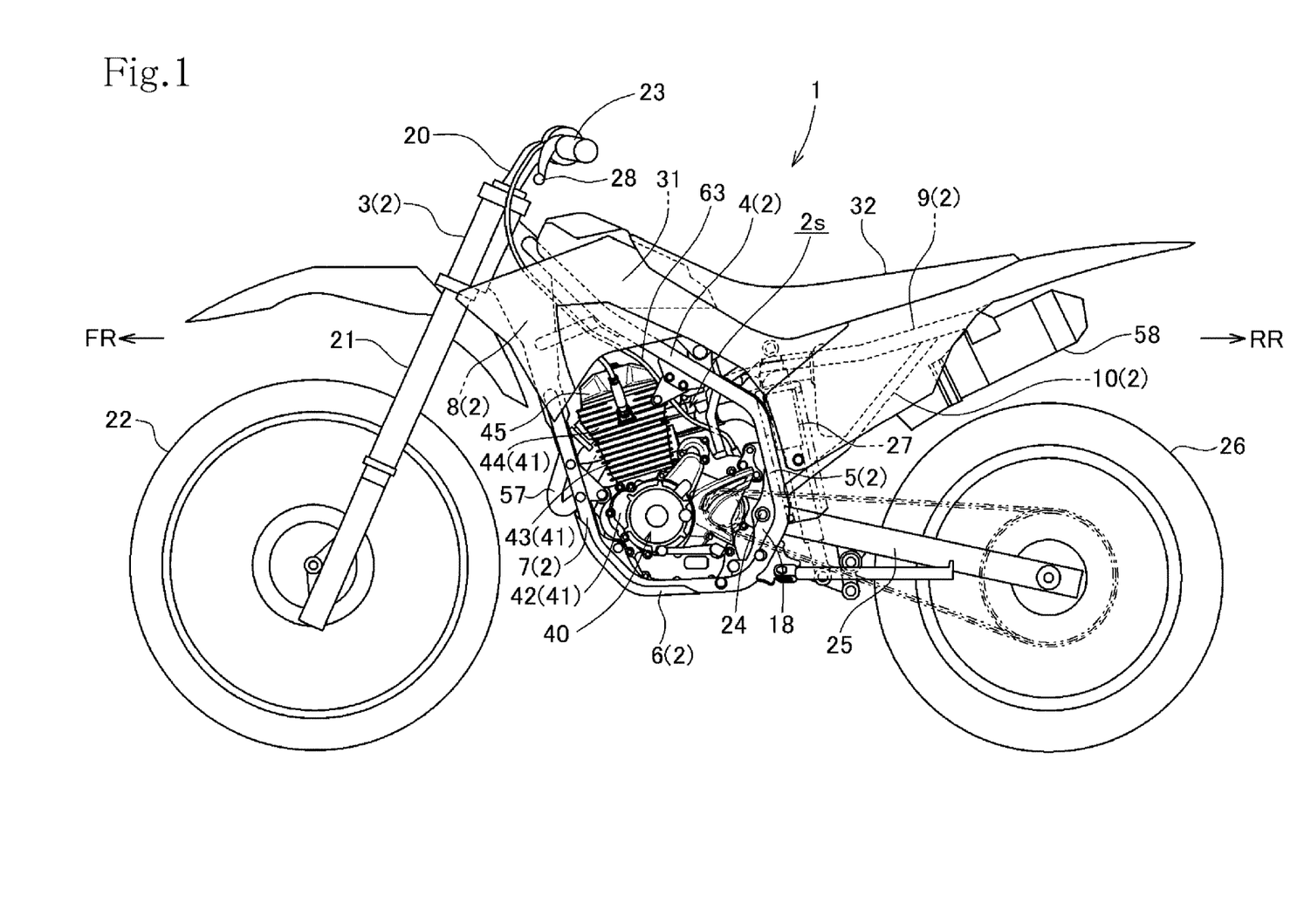
FIG. 1 is a left side view of a motorcycle to which the vehicle structure according to an embodiment of the present invention is applied.

FIG. 1 is a side view of a motorcycle 1 which is a saddle-riding vehicle to which an embodiment of the present invention is applied.

In the description herein and throughout the claims, directions such as front, rear, left and right refer to directions relative to the traveling direction of the motorcycle 1, the traveling direction being the forward direction. In the drawings, "FR" indicates the front direction, "RR" indicates the rear direction, "LH" indicates the left direction and "RH" indicates the right direction.

The motorcycle 1 is a sport motorcycle used for off-road driving. A body frame 2 of the motorcycle 1 is a double cradle type frame.

A pair of left and right upper frame portions 4 extends downward from a head pipe 3 to be separated into left and right frame members, and the left and right upper frame portions 4 are slightly inclined downwardly toward the rear. Rear frame portions 5 are bent respectively at rear ends of the respective upper frame portions 4 to extend downward from the rear ends. Lower frame portions 6 are bent respectively at the lower ends of the respective rear frame portions 5 to extend forward from the lower ends. Front frame portions 7 are bent respectively at the front ends of the respective lower frame portions 6 to extend from the front ends in an obliquely forward and upward direction. Each of the left and right sets of the upper, rear, lower and front frame portions 4, 5, 6 and 7 is formed by bending a single pipe. Upper ends of the front frame portions 7 are joined to a single down frame 8 extending downward from the head pipe 3. Thus, a pair of left and right ring-shaped frames is configured.

An internal combustion engine 40 is installed by being supported in an inside space 2s that is defined by the pair of left and right ring-shaped frames.

Further, a pair of left and right seat rails 9 extends rearward from the downwardly bent rear ends of the upper frame portions 4. Each of back stays 10 is connected between a rear portion of the associated seat rail 9 and a bent portion at a midpoint of the associated rear frame portion 5.

The body frame 2 is a semi-double cradle frame configured as described above.

In the motorcycle 1 including the semi-double cradle frame as described above, as shown in FIG. 1, a steering shaft 20 is pivotally supported in a rotatable manner by the head pipe 3 at the front end of the body frame 2. A front fork 21 is bifurcated at a lower portion of the steering shaft 20 and then the front fork 21 extends downward from the lower portion. A front wheel 22 is rotatably supported at the lower ends of the front fork 21, and the front wheel 22 is steered through a handlebar 23 that is mounted at the top end of the steering shaft 20 to extend both leftward and rightward from the top end.

Pivot bearings 18 are placed on lower bends of the rear frame portions 5. A rear fork 25 has its front end pivotally supported by a pivot shaft 24 in the pivot bearings 18, and the rear fork 25 extends rearward. A rear wheel 26 is rotatably supported at vertically swingable rear ends of the rear fork 25.

The rear fork 25 has a link portion close to the pivot shaft 24. A rear cushion 27 is disposed between the link portion and the front portion of the seat rail 9 to extend in the vertical direction.

The internal combustion engine 40 is a four-stroke-cycle, single cylinder, air-cooled internal combustion engine. An engine body 41 is configured such that a cylinder 43, a cylinder head 44 and a cylinder head cover 45 are placed in this order on a crankcase 42. In the engine body 41 mounted, the cylinder 43 and the cylinder head 44 are in a vertical position of standing on the crankcase 42 while the cylinder 43 and the cylinder head 44 lean slightly forward along the front frame portions 7, and the engine body 41 is mounted within the inside space 2s of the body frame 2 such that the engine body 41 is placed into a transverse position with its crankshaft being oriented in the left-right direction along the vehicle width.

Above the internal combustion engine 40 mounted in the inside space 2s of the body frame 2, a fuel tank 31 is supported by the upper frame portions 4, and a seat 32 is placed rearward of the fuel tank 31 by being supported by the seat rails 9.

Figure 2:
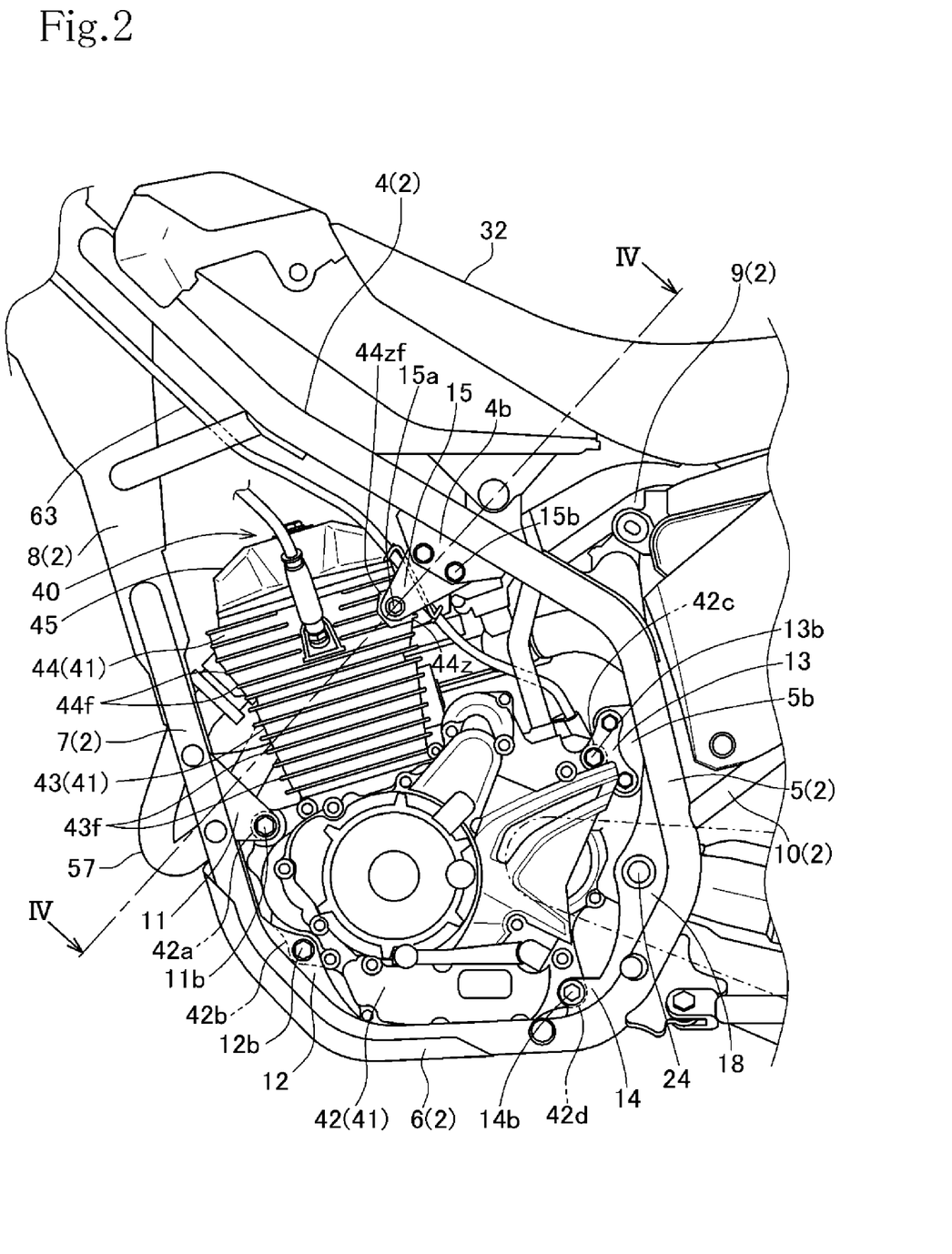
FIG. 2 is a left side view of the motorcycle illustrating the vehicle structure for mounting an internal combustion engine.
Figure 3:
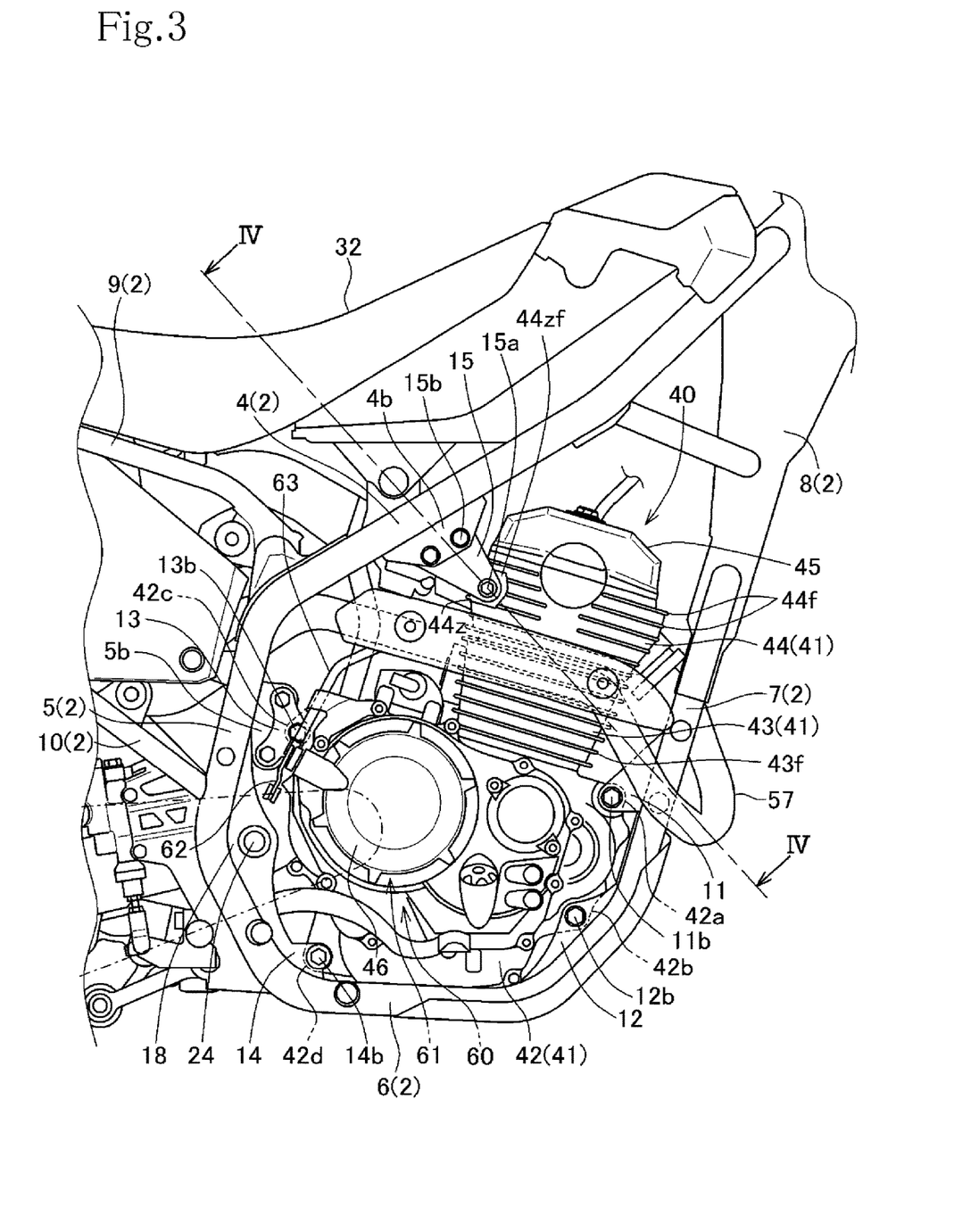
FIG. 3 is a right side view of the motorcycle illustrating the vehicle structure for mounting an internal combustion engine.

Referring to FIGS. 2 and 3, on the front side of the crankcase 42, hanger bosses 42a at an upper front side are fastened to crankcase hanger plates 11 with bolts 11b, the crankcase hanger plates 11 protruding respectively from the front frame portions 7. Further, hanger bosses 42b at a lower front side of the crankcase 42 are fastened to crankcase hanger plates with bolts 12b, the crankcase hanger plates 12 being formed respectively on the front-end bends of the lower frame portions 6.

On the rear side of the crankcase 42, crankcase hanger bosses 42c at an upper rear side are fastened to crankcase hanger plates 13 with bolts 13b, the case hanger plates 13 protruding respectively from supporting brackets 5b extending out from slightly above the middle portions of the respective rear frame portions 5. Crankcase hanger bosses 42d at a lower rear side of the crankcase 42 are fastened to crankcase hanger plates 14 with bolts 14b, the crankcase hanger plates 14 being formed respectively on a rear-end bends of the lower frame portions 6.

In order to support the crankcase 42 of the engine body 41, the crankcase hanger bosses 42a and 42b at the two front points are joined to the body frame 2 through the crankcase hanger plates 11 and 12, and the crankcase hanger bosses 42c and 42d at the two rear points are joined to the body frame 2 through the case hanger plates 13 and 14.

Thus, the rear and front of the crankcase 42 are joined to a lower half of the body frame 2.

The engine body 41 is supported in a manner that not only the crankcase 42 is joined to the lower half of the body frame 2, but also the cylinder head 44 standing above the crankcase 42 is joined to the upper frame portions 4 forming an upper portion of the body frame 2.

Lower and upper cooling fins 43f and 44f are formed both on the outer periphery of the cylinder 43 standing from the crankcase 42 and on the outer periphery of the cylinder head 44, and the cooling fins 43*f* and 44*f* extend in the peripheral directions of the cylinder 43 and the cylinder head 44.

Referring to FIG. 5 to FIG. 8, left and right cylinder head hanger attaching seats 44*z* are formed on right and left symmetric areas closest to the upper frame portions 4 along the rear side edges of the left and right side faces of the cylinder head 44. The cylinder head hanger attaching seats 44*z* include left and right cylinder head hanger seating surfaces 44*zf* (surfaces shown by dotted shading in FIG. 5 to FIG. 8) which are left and right flat surfaces perpendicular to the left-right horizontal direction. The cylinder head hanger seating surfaces 44*zf* are formed by machining or cutting out parts of the cylinder head 44 together with parts of the cooling fins 44*f*.

Figure 4:
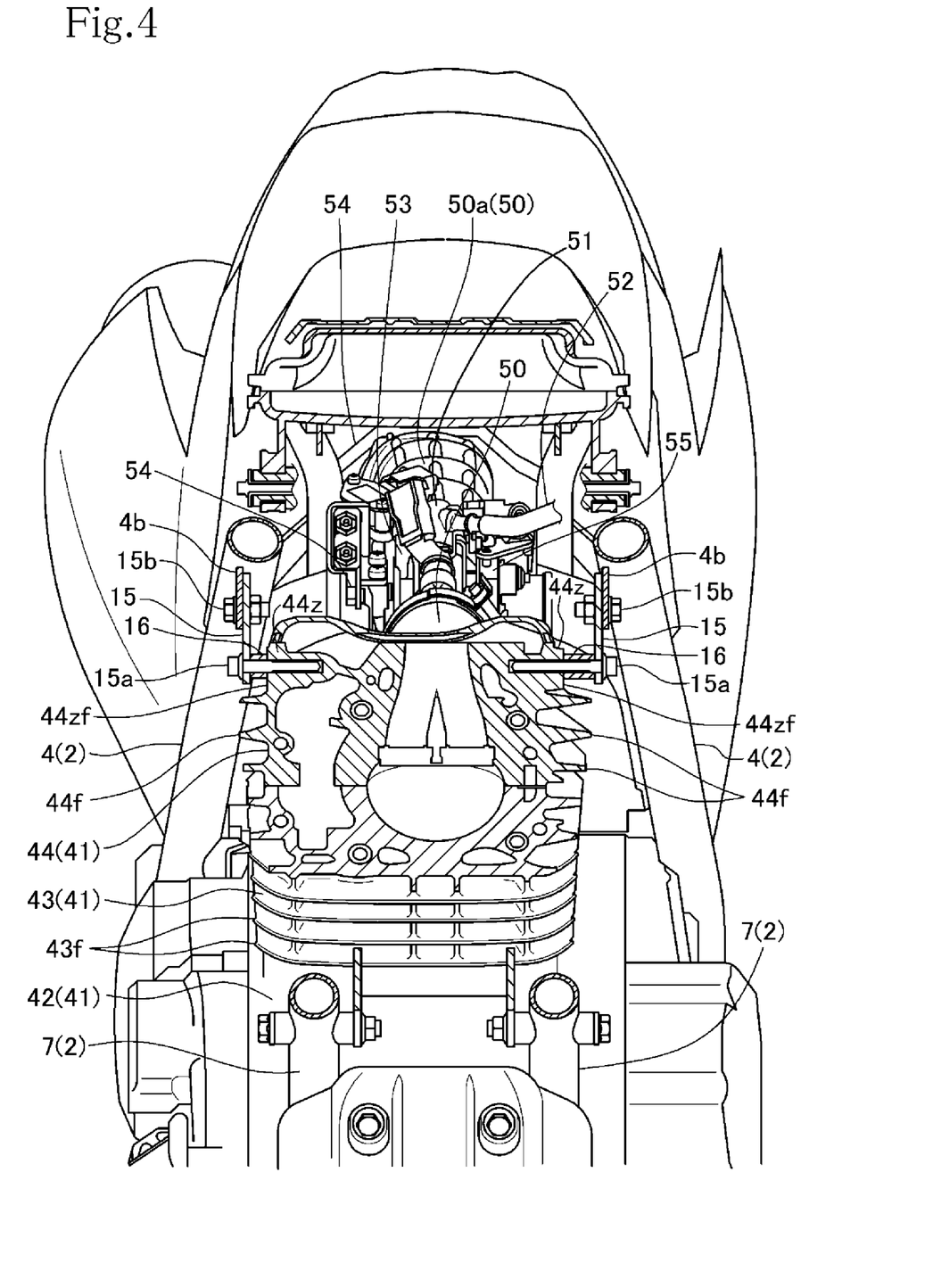
FIG. 4 is a sectional view taken along a line of arrows IV in FIGS. 2 and 3.

As illustrated in FIG. 4, the pair of left and right upper frame portions 4 is situated respectively upward of the left and right cylinder head hanger seating surfaces 44*zf*.

Supporting brackets 4*b* are formed to protrude on areas of the upper frame portions 4 closest to the cylinder head hanger attaching seats 44*z*.

Cylinder head hanger plates 15 are interposed respectively between the left and right cylinder head hanger attaching seats 44*z* on the cylinder head 44 and the supporting plates 4*b* formed to protrude on the upper frame portions 4.

Figure 5:
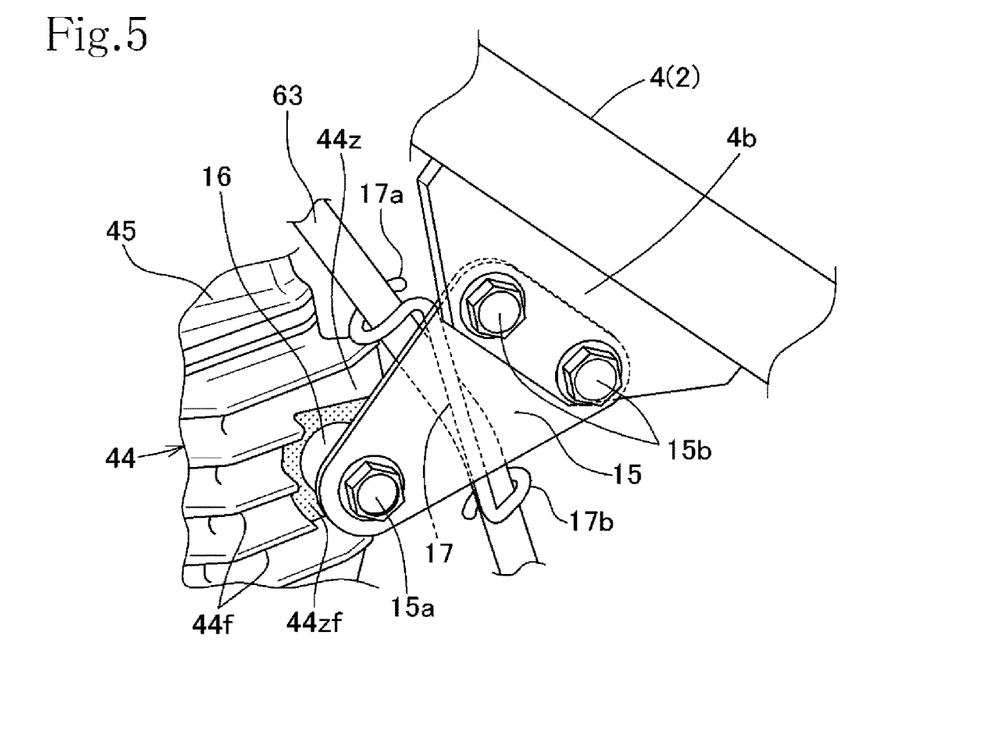
FIG. 5 is a perspective view illustrating an attaching structure of a left cylinder head hanger plate.
Figure 6:
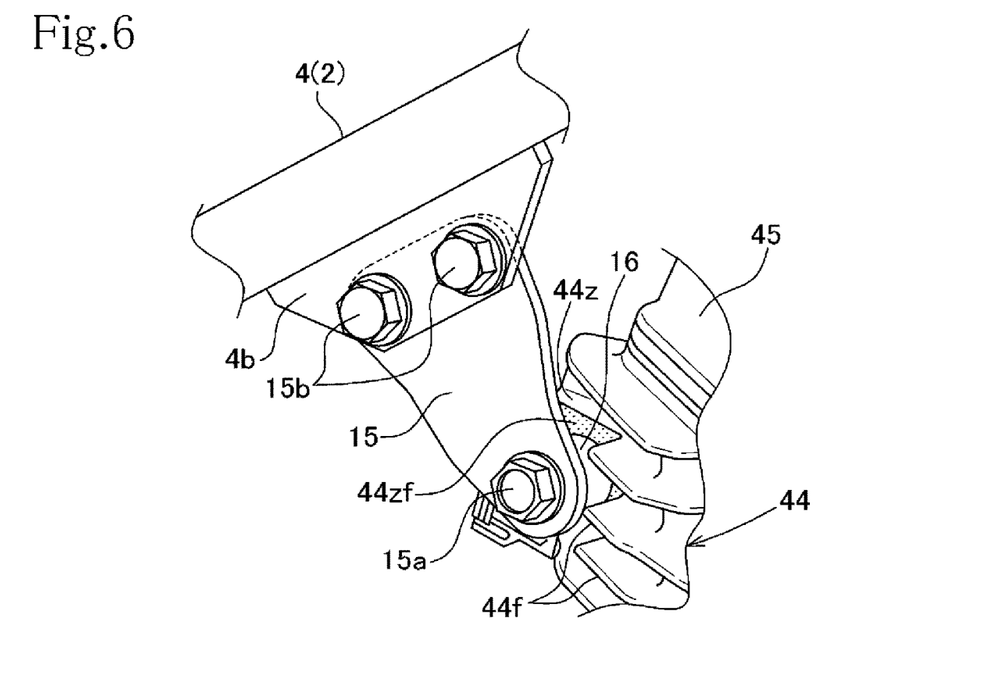
FIG. 6 is a perspective view illustrating an attaching structure of a right cylinder head hanger plate.

Referring to FIGS. 5 and 6, each of the cylinder head hanger plate 15 is formed in a triangular plate shape. Each of the cylinder head hanger plates 15 has one end facing the cylinder head hanger seating surface 44*zf* via a cylinder-shaped collar 16 which is a spacer member, and the one end is fastened to the cylinder head hanger attaching seat 44*z* with a bolt 15*a*. The cylinder head hanger plate 15 is in a vertical attitude perpendicular to the left-right horizontal direction, and the cylinder head hanger plate 15 is fastened at two points on the other end to the supporting bracket 4*b* with bolts 15*b*, the supporting bracket 4*b* being formed to protrude on the upper frame portion 4.

The cylinder head hanger plate 15 is an unbendable flat plate member, and the portion fastened to the upper frame portion 4 is not offset from the portion fastened to the supporting bracket 4*b*. Because of this, the cylinder head hanger plate 15 is of lightweight and has a high rigidity.

The slightly forwardly leaning cylinder head 44 of the engine body 41 is supported in a manner that the cylinder head hanger attaching seats 44*z* in the highest positions along the rear edges of the left and right side faces are joined, respectively, via the cylinder head hanger plates 15 to the upper frame portions 4 of the body frame 2.

Therefore, the engine body 41 has its crankcase 42 supported by and joined to the lower half of the body frame 2, and has its cylinder head hanger attaching seats 44*z*, located in the highest positions of the cylinder head 44, supported by and joined to the upper portion of the body frame 2 through the cylinder head hanger plates 15 which are in the vertical attitude perpendicular to the left-right horizontal direction. As a result, the body frame 2 can be reinforced through the engine body 41 itself without using particular reinforcing members, in order to improve the rigidity of the body frame 2.

Further, the left and right symmetric areas of the cylinder head 44, together with the corresponding parts of the cooling fins 44*f*, are cut out by machining in order to form the left and right cylinder head hanger seating surfaces 44*zf*. Because of this, weight reduction of the cylinder head 44 is achieved, and also adjusting changes of the height of the cylinder head hanger seating surfaces and an improvement in mounting accuracy can be made.

The cylinder head hanger seating surfaces 44*zf*, which are formed in the left and right symmetric areas closest to the upper frame portions 4 along the rear edges of the left and right side faces of the forward-leaning cylinder head 44, are located in the highest positions of the cylinder head 44. And, by use of the cylinder head hanger plates 15 with a length as short as possible, the cylinder head hanger seating surfaces 44*zf* are joined, at positions as high as possible, to the upper frame portions 4 which are inclined downwardly toward the rear. This enables an improvement in structural rigidity of the body frame 2.

The collar 16 is interposed between each of the cylinder head hanger plates 15 and the corresponding one of the cylinder hanger attaching seats 44*z* of the cylinder head 44, whereby, as will be understood from FIG. 4, one end of the cylinder head hanger plate 15 is fastened at a distance equal to or greater than the amount of protrusion of the cooling fins 44*f* away from the cylinder head hanger seating surface 44*zf* toward outside in the left/right direction. Thus, the cylinder head hanger seating surface 44*zf*, which is created by cutting, is covered with the cylinder head hanger plate 15 at a height equal to or greater than the amount of protrusion of the cooling fins 44*f*. Thereby, as illustrated in FIGS. 5 and 6, not only the external appearance quality can be improved, but also the cylinder head hanger plate 15 can protect the cut corner of the cooling fins 44*f* around the cylinder head hanger plate 15.

Figure 7:
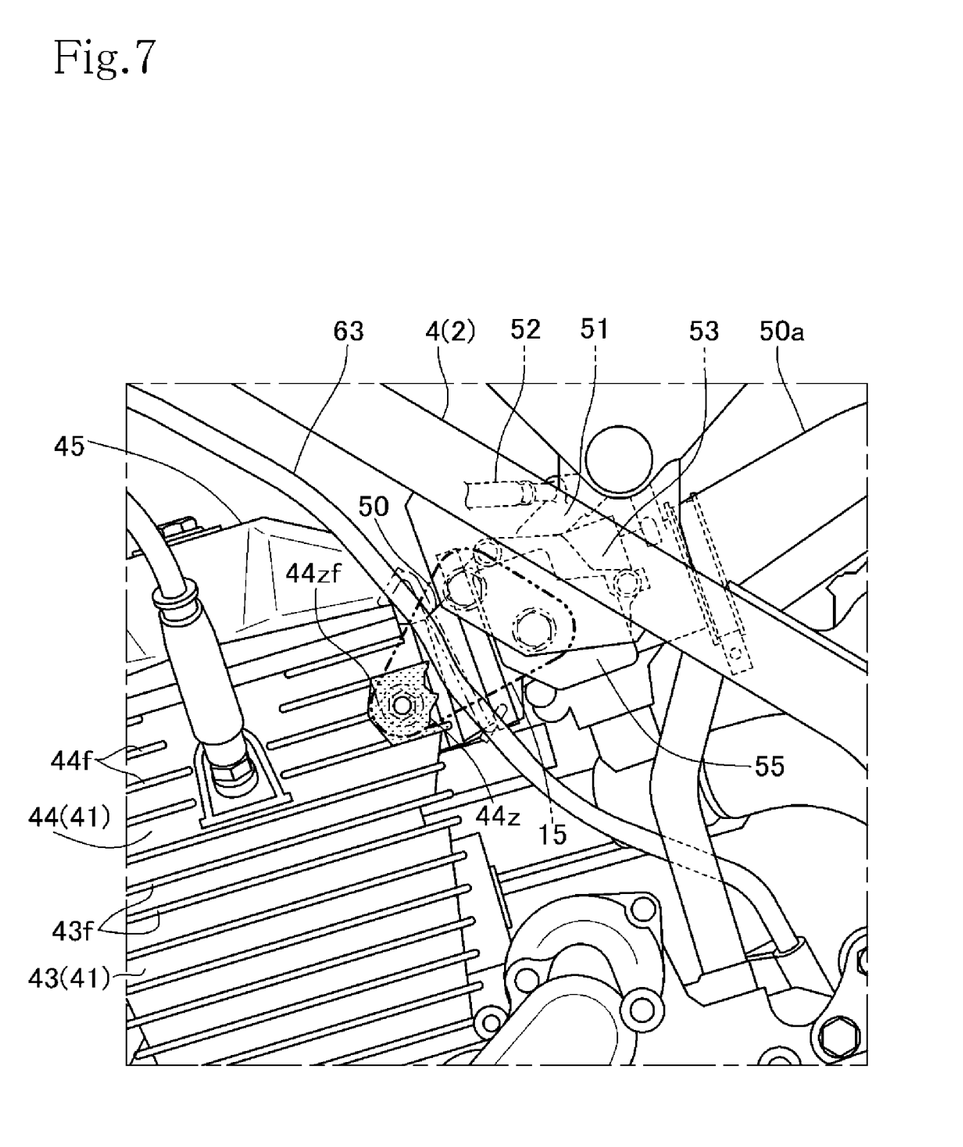
FIG. 7 is a left side view of an essential part with the left cylinder head hanger plate removed.
Figure 8:
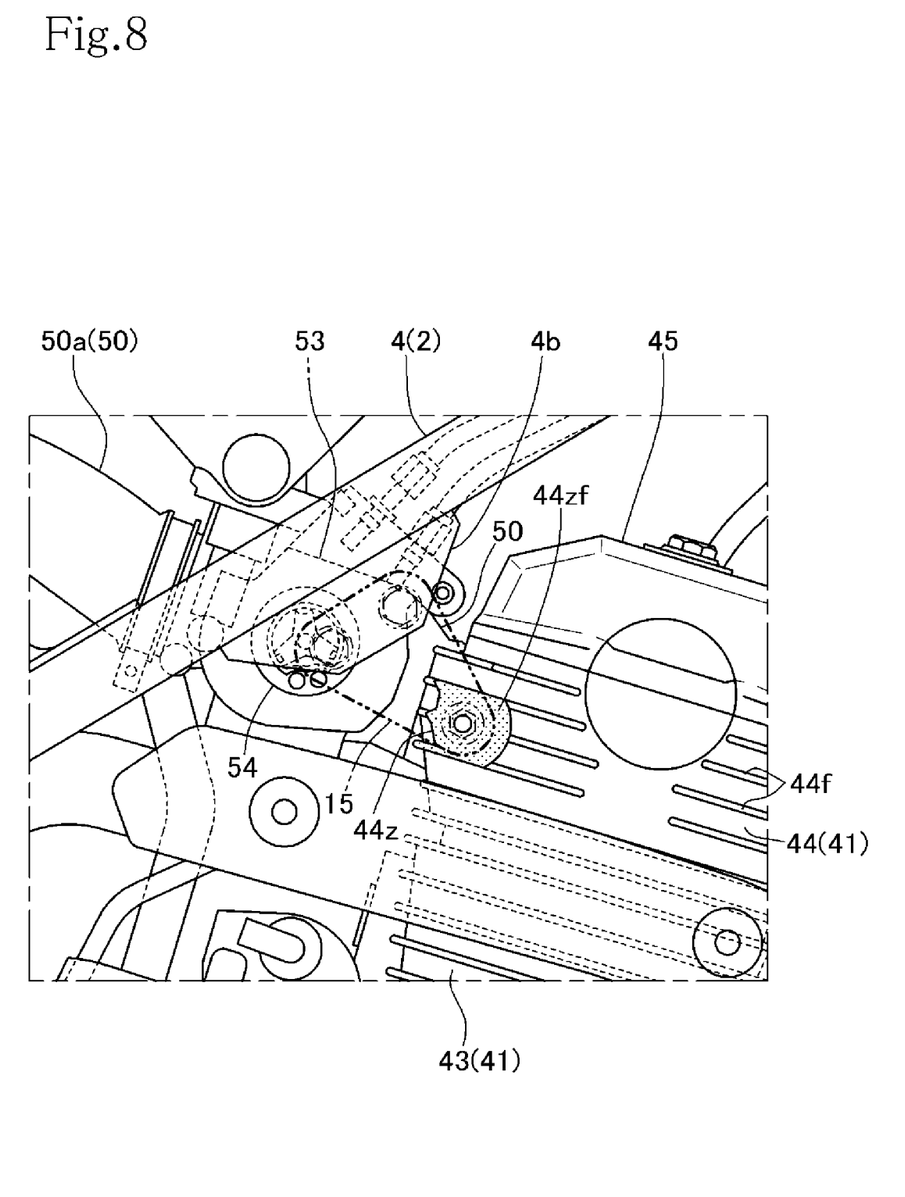
FIG. 8 is a right side view of an essential part with the right cylinder head hanger plate removed.

As illustrated in FIGS. 7 and 8, an intake passage 50 extends rearward from the rear side face of the cylinder head 44 of the standing engine body 41 of the internal combustion engine 40 installed in the body frame 2.

As will be noted from FIGS. 7 and 8, the intake passage 50 is provided with a throttle body 53 in proximity to the cylinder head 44, and a fuel injection valve 51 is placed on the cylinder head side of the throttle body 53.

A fuel supply hose 52 is connected to the fuel injection valve 51. The throttle body 53 is accompanied by an intake throttle pulley 54 placed on the right side of the throttle body 53, and also by a throttle opening sensor 55 placed on the left side.

In the intake passage 50, a connecting tube 50*a* extends rearward from the throttle body 53 to be joined to an air cleaner 56 located rearward (see FIG. 4).

As illustrated in FIGS. 7 and 8, the throttle body 53 and the fuel injection valve 51 are placed on the intake passage 50 in proximity to the cylinder head 44, and the left and right sides of the throttle body 53 and the fuel injection valve 51 are covered respectively with the left and right cylinder head hanger plates 15 which join the cylinder head 44 of the engine body 41 to the upper frame portions 4 of the body frame 2.

FIGS. 7 and 8 illustrate side views showing a state in which the cylinder head hanger plate 15 is removed and indicated with a dash-dot-dot line.

Because the left and right cylinder head hanger plates 15 cover the left and right sides of the throttle body 53 and the fuel injection valve 51, the left and right cylinder head hanger plates 15 serve to protect the throttle body 53 as well as the intake throttle pulley 54, the throttle opening sensor 55 and so on which accompany the throttle body 53. Further, the left and right cylinder head hanger plates 15 serve to protect the fuel injection valve 51 and the fuel hose 52 extending from the fuel injection valve 51.

As shown in FIG. 1, an exhaust pipe 57, which forms an exhaust passage, extends from the front side face of the cylinder head 44 of the engine body 41.

In FIG. 1, the exhaust pipe 57, which is extended from the front side face of the cylinder head 44, is bent to extend rearward along the right side face of the cylinder head 44, and then the exhaust pipe 57 is connected to an exhaust muffler 58 which is hung by the right seat rail 9.

The left cylinder head hanger plate 15 is attached to the hanger seating surface 44zf of the left side face of the cylinder head 44 with the bolt 15a by interposition of the collar 16 to create a distance equal to or greater than the amount of protrusion of the cooling fins 44f away from the cylinder head hanger seating surface 44zf toward outside in the left direction. Because of this, there is an extra clearance between the left cylinder head hanger plate 15 and the intake passage 50, as illustrated in FIG. 5, and hence the extra clearance is utilized to attach a clutch cable guide 17 to the inside face of the left cylinder head hanger plate 15.

As will be seen from FIG. 4, there is a room for the right cylinder head hanger plate 15 (left side in FIG. 4) as opposed to the left cylinder head hanger plate 15 to be placed more inward of the upper frame portion 4. Because of this, the right collar 16 may be excluded and the cylinder head hanger plate 15 may be fastened directly to the right hanger seating surface 44zf of the cylinder head 44. This can improve stiffness.

In this case, the right cylinder head seating surface 44zf may be formed to have an enlarged area in order to achieve improved workability of removal of the bolt 15a.

Referring to FIG. 3, a transmission 60 is arranged in a rear half of the crankcase 42 of the engine body 41, and a clutch 61 is provided on the right side of the transmission 60 and the clutch 61 is covered with a clutch cover 46.

A clutch actuating lever 62 is provided on a rear portion of the clutch cover 46 to actuate the clutch 61. An end of a clutch cable 63 is coupled to a swinging distal end of the clutch actuating lever 62.

As illustrated in FIGS. 2 and 3, the clutch cable 63 extends upward from the clutch actuating lever 62 on the rear portion of the clutch cover 46 on the right side of the crankcase 42, and then turns to the left to pass under the throttle body 53, and then heads upward along the inside face of the left cylinder head hanger plate 15.

Referring to FIG. 5, the clutch cable guide 17 is fixed to the inside face of the left cylinder head hanger plate 15.

The clutch cable guide 17 is formed in a wire shape, and has a central linear portion fixed to the inside face of the cylinder head hanger plate 15. The clutch cable guide 17 has partially opened upper and lower ring-shaped portions 17a and 17b formed at both ends extending in the vertical directions.

The clutch cable 63 is held by the upper and lower ring-shaped portions 17a and 17b of the clutch cable guide 17 which is fixed to the inside face of the left cylinder head hanger plate 15. Thus, the clutch cable 63 is guided along the inside face of the left cylinder head hanger plate 15 in the vertical direction.

Referring to FIG. 1, the clutch cable 63 is guided by the clutch cable guide 17 to head upward along the inside face of the left cylinder head hanger plate 15, and then the clutch cable 63 extends along the lower side of the left upper frame portion 4 of the body frame 2 in an obliquely forward and upward direction. Then, the clutch cable 63 heads upward along the head pipe 3. And then, the clutch cable 63 is coupled to an end of a clutch operating lever 28 provided on the left side of the handlebar 23.

In this manner, the clutch cable 63 is guided by the clutch cable guide 17 which is attached to the inside face of the left cylinder head hanger plate 15 through the use of the extra space. Hence, although the clutch cable 63 is routed with gentle curves without having any sharp bend, the clutch cable 63 can provide coupling between the clutch actuating lever 62 and the clutch operating lever 28 at a distance as short as possible. This enables a reduction in clutch operating load to improve the operability.

Although the vehicle installation structure for an air-cooled internal combustion engine according to an embodiment of the present invention has been described, aspects of the present invention are not limited to the above embodiment, and the present invention includes what is implemented in various aspects without departing from the sprit and scope of the present invention.

For example, the vehicle structure of the present invention is not limited to application to the motorcycle for off-road driving in the embodiment, and may be applied to any other of various saddle ridding vehicles, provided that a vehicle satisfies requirements of the claims.

REFERENCE SIGNS LIST

1 . . . Motorcycle
2 . . . Body frame
3 . . . Head pipe
4 . . . Upper frame portion
5 . . . Rear frame portion
6 . . . Lower frame portion
7 . . . Front frame portion
8 . . . Down frame
9 . . . Seat rail
10 . . . Back stay
11 . . . Crankcase hanger plate
12 . . . Crankcase hanger plate
13 . . . Crankcase hanger plate
14 . . . Crankcase hanger plate
15 . . . Cylinder head hanger plate
16 . . . Collar
17 . . . Clutch cable guide
18 . . . Pivot bearing
20 . . . Steering shaft
21 . . . Front fork
22 . . . Front wheel
23 . . . Handlebar
24 . . . Pivot shaft
25 . . . Rear fork
26 . . . Rear wheel
27 . . . Rear cushion
28 . . . Clutch operating lever
31 . . . Fuel tank
32 . . . Seat
40 . . . Internal combustion engine
41 . . . Engine body
42 . . . Crankcase
43 . . . Cylinder
43f . . . Cooling fins
44 . . . Cylinder head
44f . . . Cooling fins
45 . . . Cylinder head cover
46 . . . Clutch cover
50 . . . Intake passage
50a . . . Connecting tube
51 . . . Fuel injection valve
52 . . . Fuel hose
53 . . . Throttle body
54 . . . Intake throttle pulley
55 . . . Throttle opening sensor
56 . . . Air cleaner 57 . . . Exhaust pipe
58 . . . Exhaust muffler
60 . . . Transmission
61 . . . Clutch
62 . . . Clutch actuating lever
63 . . . Clutch cable

The invention claimed is:

1. A vehicle structure comprising:
an air-cooled internal combustion engine, in which the air-cooled internal combustion engine is mounted on a double cradle body frame of a saddle riding vehicle, the air-cooled internal combustion engine is configured such that a cylinder and a cylinder head are vertically stacked on a crankcase in this order and cooling fins are formed on an outer periphery of at least the cylinder head,
wherein the crankcase has hanger bosses formed at predetermined forward and rearward positions, the crankcase being supported by the body frame with the hanger bosses joined to the body frame via crankcase hanger members,
wherein the cylinder head has left and right cylinder head hanger seating surfaces formed to be perpendicular to a left-right horizontal direction by cutting out right and left symmetric areas of the cylinder head as well as part of the cooling fins, the right and left symmetric areas being adjacent to side edges of left and right side faces of the cylinder head and being respectively located closest to a pair of left and right upper frame portions of the double body cradle body frame,
wherein the left and right cylinder head hanger seating surfaces of the cylinder head are formed on cylinder head hanger attaching seats,
wherein the pair of left and right upper frame portions is situated respectively upward of the left and right cylinder head hanger seating surfaces,
wherein the cylinder head hanger members are cylinder head hanger plates,
wherein the left and right cylinder head hanger plates have respective first ends facing the cylinder head seating surfaces of the cylinder head, the first ends being fastened respectively to the cylinder head hanger attaching seats, and the left and right cylinder head hanger plates have respective second ends fastened to the left and right upper frame portions, and
wherein the first ends of the cylinder head hanger plates are fastened, respectively, to the cylinder head hanger attaching seats of the cylinder head by interposition of spacer members to create distances equal to or greater than the amount of protrusion of the cooling fins away from the cylinder head hanger seating surfaces toward outside in a left/right direction.

2. The vehicle structure for mounting an air-cooled internal combustion engine according to claim 1, wherein one of the left and right cylinder head hanger plates has an inner side to which a clutch cable guide is attached.

3. The vehicle structure for mounting an air-cooled internal combustion engine according to claim 2, wherein the upper frame portion of the double cradle frame extends obliquely upward and rearward of the cylinder head to slope downward toward the rear in side view,
wherein the cylinder and the cylinder head, which are stacked in this order on the crankcase, stand while tilting forward, and
wherein the left and right cylinder head hanger seating surfaces are formed respectively in the left and right symmetric areas closest to the upper frame portions along rear edges of the left and right side faces of the cylinder head.

4. The vehicle structure for mounting an air-cooled internal combustion engine according to claim 1, wherein the upper frame portion of the double cradle frame extends obliquely upward and rearward of the cylinder head to slope downward toward the rear in side view,
wherein the cylinder and the cylinder head, which are stacked in this order on the crankcase, stand while tilting forward, and
wherein the left and right cylinder head hanger seating surfaces are formed respectively in the left and right symmetric areas closest to the upper frame portions along rear edges of the left and right side faces of the cylinder head.

5. The vehicle structure for mounting an air-cooled internal combustion engine according to claim 4, wherein the cylinder head has a rear side face from which an intake passage extends rearward,
wherein the intake passage is provided with a throttle body in proximity to the cylinder head, and
wherein the left and right cylinder head hanger plates cover left and right sides of the throttle body.

6. The vehicle structure for mounting an air-cooled internal combustion engine according to claim 5, wherein one of the left and right cylinder head hanger plates has an inner side to which a clutch cable guide is attached.

7. The vehicle structure for mounting an air-cooled internal combustion engine according to claim 4, wherein one of the left and right cylinder head hanger plates has an inner side to which a clutch cable guide is attached.

8. A vehicle structure comprising:
an air-cooled internal combustion engine, in which the air-cooled internal combustion engine is mounted on a body frame of a saddle riding vehicle, the air-cooled internal combustion engine is configured such that a cylinder and a cylinder head are vertically stacked on a crankcase in this order and cooling fins are formed on an outer periphery of at least the cylinder head,
wherein the crankcase has hanger bosses formed at predetermined forward and rearward positions, and the crankcase is supported by the body frame with the hanger bosses joined to the body frame via crankcase hanger members,
wherein the cylinder head has left and right cylinder head hanger seating surfaces formed to be perpendicular to a left-right horizontal direction by cutting out right and left symmetric areas of the cylinder head as well as part of the cooling fins, the right and left symmetric areas being adjacent to side edges of left and right side faces of the cylinder head,
wherein the left and right cylinder head hanger seating surfaces of the cylinder head are formed on cylinder head hanger attaching seats to which one ends of left and right cylinder head hanger members are fastened respectively,
wherein the left and right cylinder head hanger members have respectively the other ends fastened to the body frame,
wherein the body frame is a double cradle frame,
wherein the cylinder head is configured to stand above the crankcase,
wherein the left and right cylinder head hanger seating surfaces are formed respectively in areas on the left and right side faces of the cylinder head, the areas being respectively located closest to a pair of left and right upper frame portions of the double cradle frame, wherein the pair of left and right upper frame portions is situated respectively upward of the left and right cylinder head hanger seating surfaces, wherein the cylinder head hanger members are cylinder head hanger plates, wherein the left and right cylinder head hanger plates have respective one ends facing the cylinder head seating surfaces of the cylinder head, the one ends being fastened respectively to the cylinder head hanger attaching seats, and the left and right cylinder head hanger plates have the other ends respectively fastened to the left and right upper frame portions, wherein the upper frame portion of the double cradle frame extends obliquely upward and rearward of the cylinder head to slope downward toward the rear in side view, wherein the cylinder and the cylinder head, which are stacked in this order on the crankcase, stand while tilting forward, wherein the left and right cylinder head hanger seating surfaces are formed respectively in the left and right symmetric areas closest to the upper frame portions along rear edges of the left and right side faces of the cylinder head, wherein the cylinder head has a rear side face from which an intake passage extends rearward, wherein the intake passage is provided with a throttle body in proximity to the cylinder head, and wherein the left and right cylinder head hanger plates cover left and right sides of the throttle body.

9. The vehicle structure for mounting an air-cooled internal combustion engine according to claim 8, wherein one of the left and right cylinder head hanger plates has an inner side to which a clutch cable guide is attached.

* * * * *